United States Patent
Nair et al.

(10) Patent No.: US 12,438,882 B2
(45) Date of Patent: Oct. 7, 2025

(54) METHOD AND SYSTEM FOR MANAGING GLOBAL CONTROL GROUP (GCG)

(71) Applicant: MoEngage Inc., San Francisco, CA (US)

(72) Inventors: Ajish Nair, Pune (IN); Sumit Bansal, Jaipur (IN)

(73) Assignee: MOENGAGE INC., San Francisco, CA (US)

(*) Notice: Subject to any disclaimer, the term of this patent is extended or adjusted under 35 U.S.C. 154(b) by 0 days.

(21) Appl. No.: 18/790,563

(22) Filed: Jul. 31, 2024

(65) Prior Publication Data
US 2025/0126129 A1    Apr. 17, 2025

(30) Foreign Application Priority Data
Oct. 13, 2023   (IN) .............................. 202311069099

(51) Int. Cl.
*H04L 9/40*        (2022.01)
(52) U.S. Cl.
CPC ................................. *H04L 63/104* (2013.01)
(58) Field of Classification Search
CPC .................................................... H04L 63/104
See application file for complete search history.

(56) References Cited

U.S. PATENT DOCUMENTS

| | | | |
|---|---|---|---|
| 9,860,316 B2* | 1/2018 | Shalita | H04L 67/1021 |
| 12,014,400 B1* | 6/2024 | Miranda | G06Q 30/0201 |
| 12,020,276 B1* | 6/2024 | Inan | G06Q 30/0205 |
| 2013/0030868 A1 | 1/2013 | Lyon et al. | |
| 2017/0345049 A1 | 11/2017 | Banerjee et al. | |
| 2018/0336588 A1 | 11/2018 | Kohareswaran et al. | |
| 2020/0320548 A1* | 10/2020 | Fusillo | G06F 18/24137 |

* cited by examiner

*Primary Examiner* — Farid Homayounmehr
*Assistant Examiner* — Suman Debnath
(74) *Attorney, Agent, or Firm* — Jason A. Smith; Shumaker, Loop & Kendrick, LLP

(57) ABSTRACT

A method for of managing a Global Control Group (GCG) for a communication event. The method includes transforming one or more user identifiers stored in a database to generate respective one or more bucket identifiers. The one or more user identifiers correspond to one or more users. A predetermined number of bucket identifiers are selected randomly. The selected bucket identifier is a member of the GCG. Further, a user identifier is received from one or more user identifiers in a run time environment. A respective bucket identifier corresponding to the received user identifier is generated in the run time environment. Further, presence of the generated bucket identifier within the selected bucket identifiers of the GCG is determined and the communication event based on the determination is restricted.

19 Claims, 5 Drawing Sheets

METHOD AND SYSTEM FOR MANAGING GLOBAL CONTROL GROUP (GCG)

PRIORITY INFORMATION

The present application does claim a priority from Indian patent application Ser. No. 202311069099 dated Oct. 13, 2023.

TECHNICAL FIELD

The present subject matter described herein, in general, relates to managing a Global Control Group (GCG) for a communication event.

BACKGROUND

The precision of gauging effectiveness of communication events, such as marketing campaigns, user engagement campaigns, user education campaigns, information broadcast, etc., continues to be a challenge in the modern, fast-paced world of digital communication. The number of external elements that affect user behaviour make it difficult for current methodologies to distinguish between the genuine impact of engagement campaigns. This uncertainty makes it difficult to fine-tune engagement strategies and obscures decision-making, highlighting the need for a more sophisticated and perceptive strategy of tracking effectiveness of communication events. Additionally, the dynamism of customer preferences and the speed at which technology is developing highlight the need for adaptive measuring systems.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for managing the GCG group for a communication event. This summary is not intended to identify essential features of the claimed subject matter nor is it intended for use in determining or limiting the scope of the claimed subject matter.

In one implementation, a method of managing a Global Control Group (GCG) for communication event is described. The method comprises transforming one or more user identifiers stored in a database to generate respective one or more bucket identifiers. The one or more user identifiers correspond to one or more users. Further, a predetermined number of bucket identifiers are selected randomly from the one or more bucket identifiers. The selected bucket identifiers is part of the GCG. The method further comprises receiving a user identifier from the one or more user identifiers in a run time environment. A respective bucket identifier is generated corresponding to the received user identifier in the run time environment. Further presence of the generated bucket identifier is determined within the selected bucket identifiers of the GCG and finally the communication is restricted event based on the determination. In one aspect, the aforementioned method for managing a Global Control Group (GCG) for a communication event may be performed by a processor using programmed instructions stored in a memory.

In yet another implementation, a system for managing a Global Control Group (GCG) for a communication event is disclosed. The system comprises a memory storing one or more instructions and a processor communicatively coupled to the memory. The processor upon execution of the one or more instructions is configured to transform one or more user identifiers stored in a database to generate respective one or more bucket identifiers. The one or more user identifiers correspond to one or more users. Further, a predetermined number of bucket identifiers are selected randomly from the one or more bucket identifiers. The selected bucket identifiers is part of the GCG. A user identifier is received from the one or more user identifiers in a run time environment. A respective bucket identifier is generated corresponding to the received user identifier in the run time environment. Further, presence of the generated bucket identifier is determined within the selected bucket identifiers of the GCG and finally the communication is restricted event based on the determination.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for managing a Global Control Group (GCG) is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
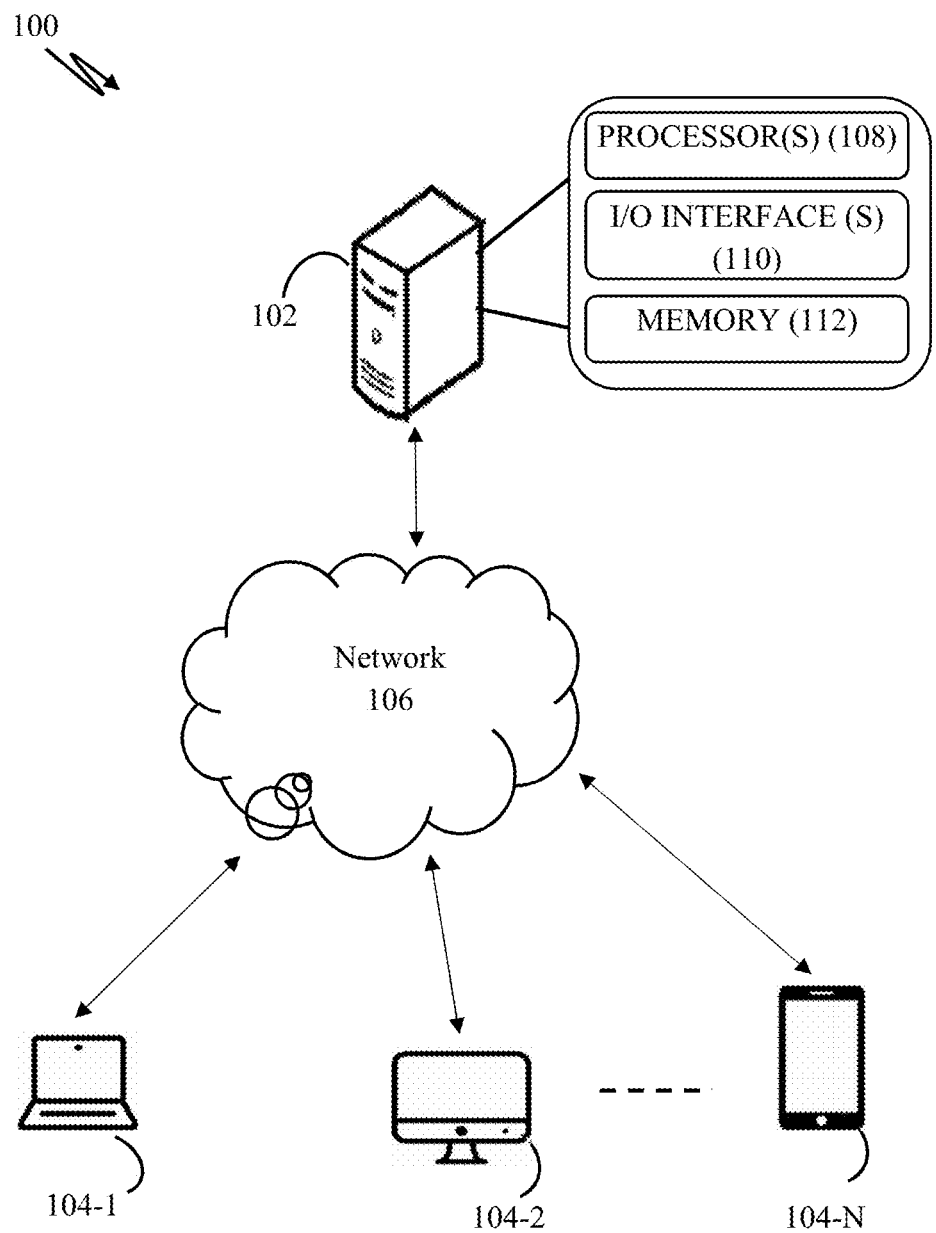
FIG. 1 illustrates a network implementation of managing a GCG for a communication event, in accordance with various embodiments of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "transforming," "selecting," "generating," "determining," "restricting" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for managing the Global Control Group (GCG) for a communication event. The GCG comprises users deliberately excluded from receiving information about, for example but not limited to, communication events such as marketing campaigns. The formation of GCG allows for a precise comparison of their user conversion rates with those who were targeted by the communication event. By including a GCG, a distinct baseline for user behaviour can be established and the effects of communication event can be separated from outside factors. This not only improves accuracy but also offers a framework for assessing success of the communication event. Another problem is the massive influx of data from numerous sources when analysing campaign effectiveness. The GCG technique provides a well-structured framework for effectively analysing and interpreting this enormous volume of data. By eliminating the delays brought on by conventional measuring techniques, it enables organizations to concentrate on pertinent data points and quickly obtain insights that can be put into practise. Another challenge is changing the size of GCG when new users are added and older users are withdrawn. The GCG's fluctuating size becomes a significant problem when user numbers rise or fall. The process of choosing and allocating qualified users to the GCG takes a long time and also for this process additional resources would be required. Thus, a lot of time is spent in generating the GCG with the intricacy involved with changing user numbers. The proposed technique and system offer an innovative solution to these technical issues. In particular, the method and system help to address the challenge of accurately measuring communication event effectiveness, by leveraging the concept of a GCG.

Referring now to FIG. 1, a network implementation 100 of managing the GCG for a communication event. The communication event may be one of the engagement campaign, marketing campaign, or any other information to be transmitted to the user. The network 100 includes a system 102, one or more user devices 104-N (for example but not limited to one or more user devices 104-1, 104-2 ... 104-N) associated with one or more users. In an embodiment, a software application may be installed at the user device 104 and the user device 104 may interact with the software application to transmit and receive data from the system 102. In an embodiment the user device 104 may be a registered user device to access the system 102. In an embodiment, the system 102 may be configured to perform one or more tasks to manage the GCG.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In one implementation, the system 102 may comprise the cloud-based computing environment in which the data storage device may operate individual computing systems configured to execute remotely located applications. Further, system 102 and the user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for managing the GCG in a run-time environment. The run-time environment may correspond to triggering of an event. The triggering event may be for example, but not limited to, an automatic distribution to users of a promotional offer on a specified day(s), for example, the first Tuesday of each month. The triggering events may be organised in advance or on the fly, and may correspond to objectives for user engagement, marketing initiatives, company goals, regulatory updates, user education, and the like.

Figure 2:
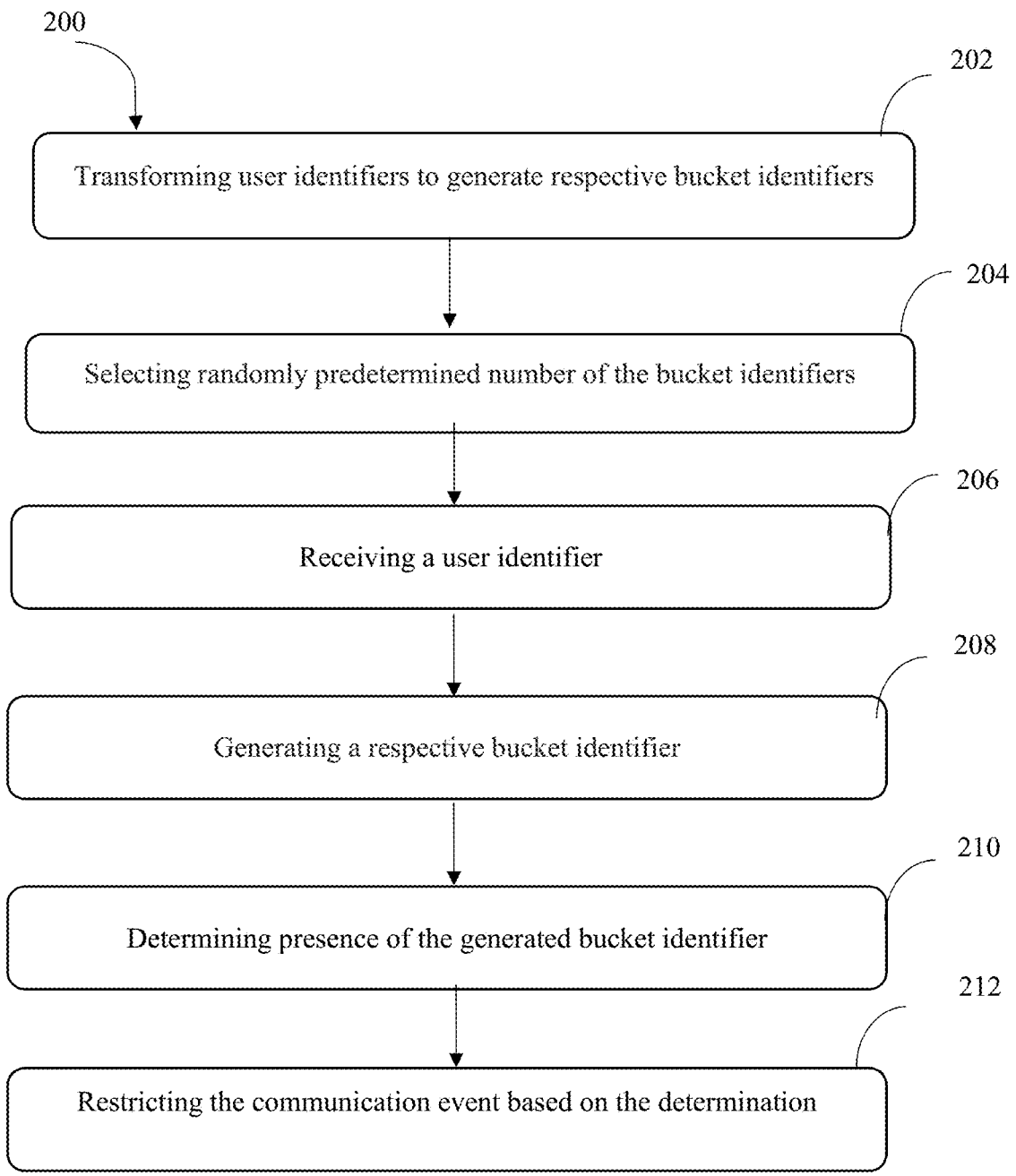
FIG. 2 illustrates a method of managing the GCG for a communication event, in accordance with various embodiments of the present subject matter.

The detailed functioning of the system 102 is described below with the help of one or more figures. In particular, the system 102 transforms user identifiers to generate respective bucket identifiers. Further, the system 102 selects randomly a predetermined number of bucket identifiers and store the selected bucket identifiers as GCG. A user identifier is received by the system 102 in a run time environment for execution of a communication event. The system 102 generates a respective bucket identifier corresponding to the received user identifier in the run time environment. The presence of the generated bucket identifier within the selected bucket identifiers of the GCG is determined and the system 102 restricts the communication event based on the determination. Referring now to FIG. 2, a method 200 for managing the GCG, is shown, in accordance with one or more embodiments of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The method 200 for managing the GCG may be implemented in any suitable hardware, software, firmware, or combination thereof. However, for ease of explanation, in the embodiments described below, the method 200 may be considered to be implemented in the network 100 of FIG. 1 by the processor(s) 108 of the system 102 in association with the other devices in the network 100.

Initially, at step 202 a processor of the system 102 may be configured to transform one or more user identifiers stored in a database to generate respective one or more bucket identifiers. The system 102 may be associated with a database that stores one or more user's information. The information may include name, email address, contact number, corresponding identifier (user identifier), and the like. In an embodiment, any information uniquely corresponding to the user may act as the user's identifier. In yet another embodiment an additional user identifier may be assigned to the user by the system for example, Id1, Id2, and so on. The one or more user identifiers uniquely correspond to one or more users.

In an embodiment, the system may transform the user identifiers into respective one or more bucket identifiers. To this end, the system may group the one or more users into one or more buckets. In an embodiment a bucket may comprise one user. For example, Single User Buckets: where a bucket may consist of a single user. Each bucket may contain only one individual user, and these single-user buckets may be utilized for specific scenarios or campaigns where individualized targeting, or analysis is required. The system may assign a unique identifier, known as a 'bucket identifier,' to each of these buckets. In this scenario, each user may correspond to a unique bucket identifier. In yet another embodiment, the bucket may comprise more than one user. For example, Multiple User Buckets: where a bucket may comprise more than one user. This approach may involve grouping multiple users together into a single bucket, which can be advantageous for activities that benefit from collective treatment, analysis, or engagement. The system may assign a unique identifier, known as a 'bucket identifier,' to each of these buckets. In this scenario, a group of users may correspond to a single bucket identifier, though each user of the group has a unique user identifier.

In an embodiment, to create the bucket identifiers the system may transform the existing user identifiers stored in the database into respective one or more bucket identifiers. To this end, the system may apply a transformation algorithm or mapping algorithm to the one or more user identifiers. The algorithm may involve cryptographic techniques, hashing algorithms, other mathematical operations, and the like. For example, the system may use a hashing algorithm, developed or may be developed in future, like SHA-256 MD5 (Message Digest 5), or SHA-1. The choice of an algorithm may depend on factors like security requirements and computational efficiency. Hashing algorithms are cryptographic functions used to transform input data (like user identifier) into a fixed-length string of characters, which may be a hexadecimal number or a sequence of bytes. In the present scenario, the hashing algorithm (e.g., SHA-256) may be applied to the user identifier. The hashing algorithm may perform a series of mathematical operations on the user identifier to convert the user identifier into a fixed-length hash value. In an embodiment, the fixed length hash value may serve as the corresponding bucket identifier. Hashing ensures that the same user identifier will always produce the same bucket identifier, providing consistency. In an embodiment, to generate a bucket identifier a portion of the hash value, such as the first few characters or bytes may be taken by the system. For example, the system may take the first 8 characters of the hexadecimal hash as the bucket identifier. The system may store the hashed bucket identifier associated with the user identifier in the database such as a hash table. This association allows retrieval of the correct bucket identifier when needed.

In an embodiment, the hashing algorithm employs a discrete uniform distribution of the user identifiers among the bucket identifiers. In the present scenario, the discrete uniform distribution may include allocating users corresponding to unique user identifiers to one or more buckets in a way that ensures an approximately equal number of users in each bucket, assuming a sufficiently large number of users. The goal of the hashing algorithm is to reduce prejudice or favoritism when grouping users into buckets. The hashing algorithm distributes user identifiers to buckets in a way that seems random rather than arbitrarily favoring one bucket over another. In an embodiment, while distribution of the user identifiers a bucket corresponding to a bucket identifier may include a single user. Yet in another embodiment, while distribution of the user identifiers, a bucket corresponding to a bucket identifier may comprise a plurality of users each user having a unique user identifier and the single bucket identifier.

In an embodiment, the system may store information related to the transformed bucket identifiers in a memory for example in the associated database. The information may correspond to metadata associated with the bucket identifiers. For example, the metadata may include at least one of: corresponding user identifier, name, email address of a corresponding user, and any other user related information for example, preference of the user, and the like. In an embodiment, the system may allow modifying the stored information in real-time. For example, modifying the stored information may include at least one of adding, removing, or updating the information. In an embodiment, the system may perform an update operation to save the modified information back into the memory storage system. In an embodiment, the information saved may include the user who modified the information, time stamp of modification, or nature of changes performed.

Figure 4:
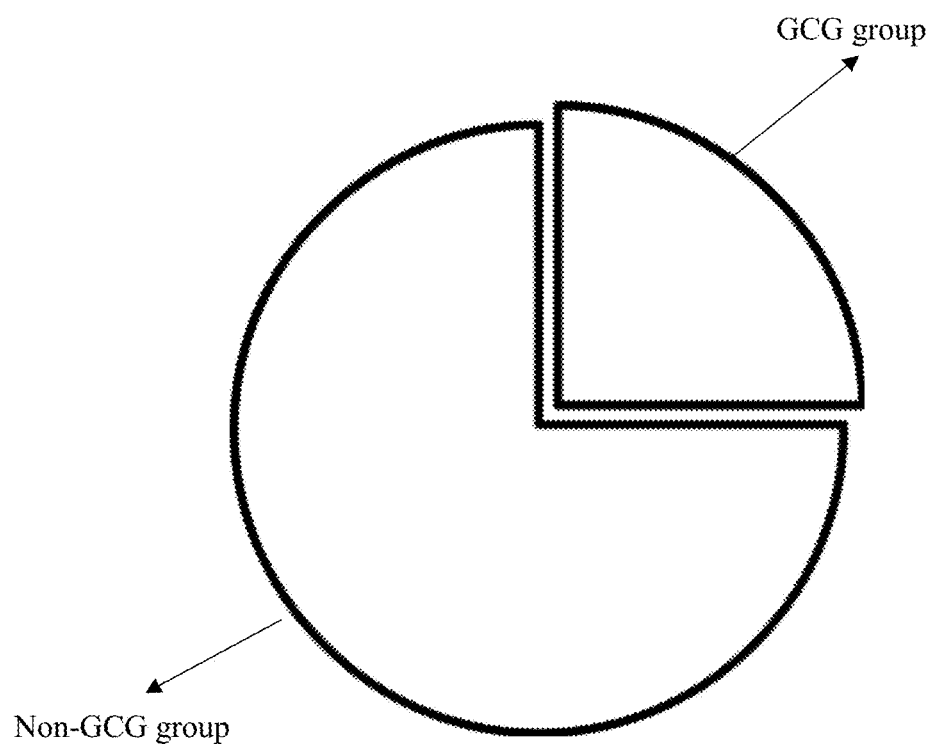
FIG. 4 illustrates an exemplary embodiment representing a percentage of users as GCG users.

In an embodiment, at step 204, the system may select a predetermined number of bucket identifiers from the one or more transformed bucket identifiers. The selected bucket identifiers are a member of the GCG. The predetermined number may be defined based on how many users are required to be a part of the GCG. For example, if there are N number of users then the predetermined number can be x % of N users, depending upon the requirement. The system may randomly select the bucket identifiers as members of the GCG. For example, to randomly select the bucket identifiers, the system may determine a total number of users. Let the number of users be N and the desired percentage of users to be a part of the GCG be x %. For example, if N=100 and x=10, then predetermined number=0.10*100=10. Now, to select the bucket identifiers randomly, the system may create a list that contains all the transformed bucket identifiers. A random number generator may be used to select 'predetermined number' unique random numbers between 1 and N (inclusive). These random numbers may serve as indices for selecting the corresponding bucket identifiers from the list. The system may populate a new list with the bucket identifiers corresponding to the randomly selected indices. For example, FIG. 4 illustrates a GCG group and Non-GCG group of users. The GCG group is represented to show a percentage of the total users.

In an embodiment, the system may store the number of bucket identifiers and the bucket identifiers which represent as a part of the GCG separately. In an alternate embodiment, the system may store a relationship between the user identifier and the bucket identifier in a database. The relationship indicating if a user associated with the user identifier corresponding to the bucket identifier is a part of GCG. In an embodiment, the users corresponding to the one or more bucket identifiers identified as a part of the GCG are restricted to receive communication from the system.

In an embodiment, the system may allow dynamic adjustment of a size of the GCG when a user identifier is added or removed from the database. In an embodiment, the dynamic adjustment may be performed by modifying the predetermined number for the selected bucket identifiers. For example, the system may continuously monitor if a user associated with a user identifier is added or removed from the system. In an embodiment, when a predefined number of users corresponding to the user identifiers are added or removed from the system, the system may determine that an adjustment to the size of the GCG is required. The predefined number of users acts as a threshold. The threshold determines when the adjustment to the size may be necessary. For example, when M number of new users are added to the system, to this end the system may allocate user identifiers to each of the new users. The system may add information related to new users in the database and allocate a bucket identifier to the new users via uniform distribution as discussed above. In the process of allocation the system may determine if the newly added number of users are greater than or equal to threshold, more users are to be added to the GCG group. To this end, the system may adjust the size of the GCG by increasing the size of the GCG according to the number of users added to the system, for example x % of M number of users may have to be added to the GCG group to account for increase in users by M number. The system may add more buckets and corresponding bucket identifiers to the GCG group to accommodate new users. In yet another example, when P number of users are removed from the system, the system may release the allocated user identifiers of each of the removed user. The system may update the database by one of the deleting information of the removed users or updating status of the users as removed. In this case, the system may adjust the size of the GCG by decreasing the size of the GCG according to the number of users removed from the system. The system may check if the users removed from the system are greater than or equal to the predefined threshold. The system may remove one or more buckets and corresponding bucket identifiers from the system. For example, the system may ensure if the removed user was part of the GCG. Upon ensuring that the removed user was a part of the GCG the bucket identifier of that user may be removed and replaced by the bucket identifier of another user that is not part of the GCG if required. In an embodiment, the dynamic adjustment of the size of the GCG is performed in real-time by the system. The real time may mean the time at which a user is added or removed form the database of the system.

Figure 3:
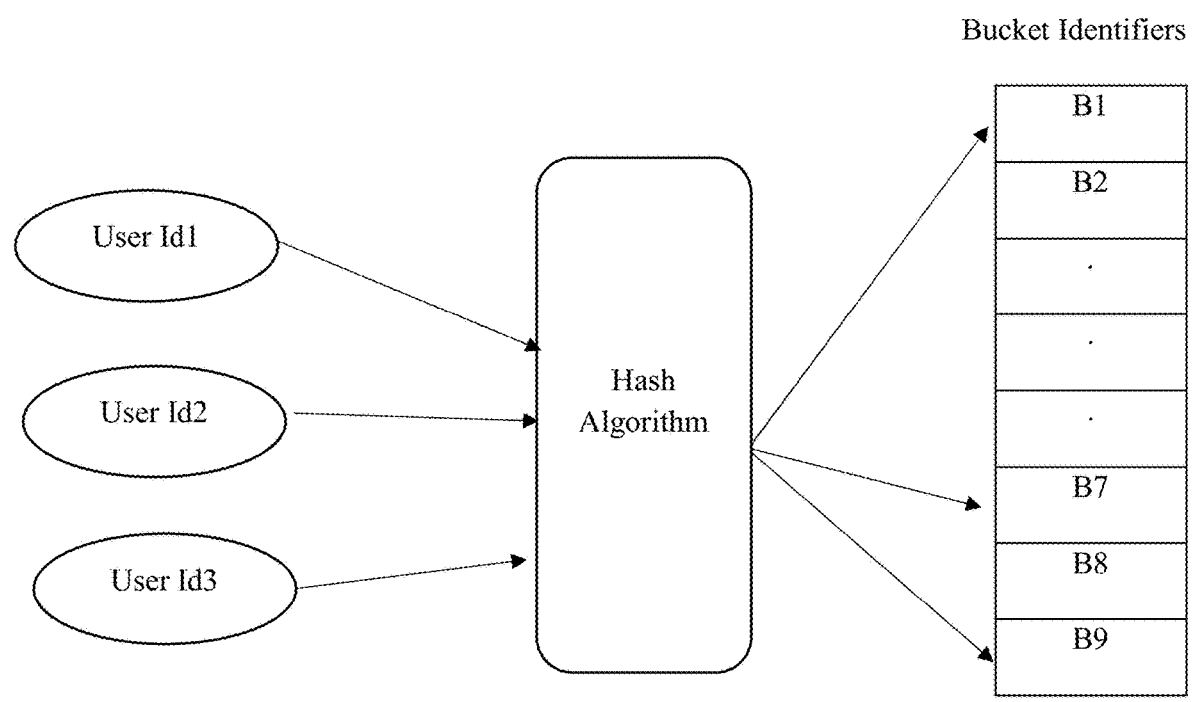
FIG. 3 illustrates generation of bucket identifiers via hashing algorithm, in accordance with an example embodiment.

In an embodiment at step 206, the system may receive a user identifier from the one or more user identifiers in run-time environment. For example, the system may receive one or more user identifiers corresponding to users to determine if these users are member of the GCG. The system may receive the user identifier via user device graphical interface. In an embodiment, the system may, at step 208, generate a respective bucket identifier corresponding to the received user identifier in the run-time environment. In an embodiment, to generate the respective bucket identifier a hashing algorithm may be executed on the received one or more user identifiers. The hashing algorithm may be applied in real time to one or more user identifiers. For example, referring to FIG. 3, a user identifier ID1 is passed to a hashing algorithm. The hashing algorithm may generates bucket identifiers for the one or more users by utilizing the user identifiers. For example, the user identifier ID1 (as shown in FIG. 3) is passed to the hashing algorithm and associated bucket identifier B1 is generated by the hashing algorithm. Further, the associated bucket identifier is stored and retrieved from the database based on system requirements. In an embodiment, the system may retrieve all the user identifiers corresponding to a particular bucket identifier like B1, the system may perform a mapping using the hashing algorithm and may return a list or set of user identifiers associated with the bucket identifier B1. The hashing algorithm consistently produces the same bucket identifier for the same user identifier to ensure consistency and reproducibility. The user identifiers act as a key to the bucket identifiers.

In an embodiment, the system at step 210, may determine presence of the one or more generated bucket identifiers, from the user identifiers, within the selected bucket identifiers of the GCG. In an embodiment, the system may determine the presence by matching the generated bucket identifiers with the selected bucket identifiers of the GCG and identify the matched bucket identifiers as a member of the GCG. For example, the system may fetch a list of the selected bucket identifiers which are determined as members of GCG. The system may fetch the list of the selected bucket identifiers from the associated database. The system may initiate a matching process and compares the user's bucket identifier for example, user identifier B1 of FIG. 3, with the selected bucket identifiers representing the GCG. If the user's bucket identifier matches one of the selected GCG bucket identifiers, the system may identify the corresponding user as a member of the GCG and may proceed with actions specific to GCG members. In an embodiment, upon determining that the bucket identifier and ultimately the corresponding user identifier is a member of the GCG, the system at step 212 restricts the communication event for a user associated with the user identifier. In an exemplary embodiment, the system may restrict communication related to engagement campaigns to the user associated with the user identifier. The engagement campaigns are launched by organizations to develop meaningful interactions, build relationships, and encourage active participation of users. The key aspects of the engagement campaign include understanding target user's interests, preferences, and demands to tailor the campaign's messaging and actions according to the user.

In an embodiment, the system may generate a notification, displayed on a device, notifying that the user identifier is determined as the member of the GCG.

In an embodiment, upon determining that the user identifier, is not a part of the GCG, the system may transmit one or more messages to the user corresponding to the user identifier. In an embodiment, the system may transmit the one or more messages when a respective generated bucket identifier does not match the selected bucket identifiers representing the GCG. The one or more messages may be via emails, push notifications, in-app messages, or any other communication method developed or may be developed in the future.

Figure 5:
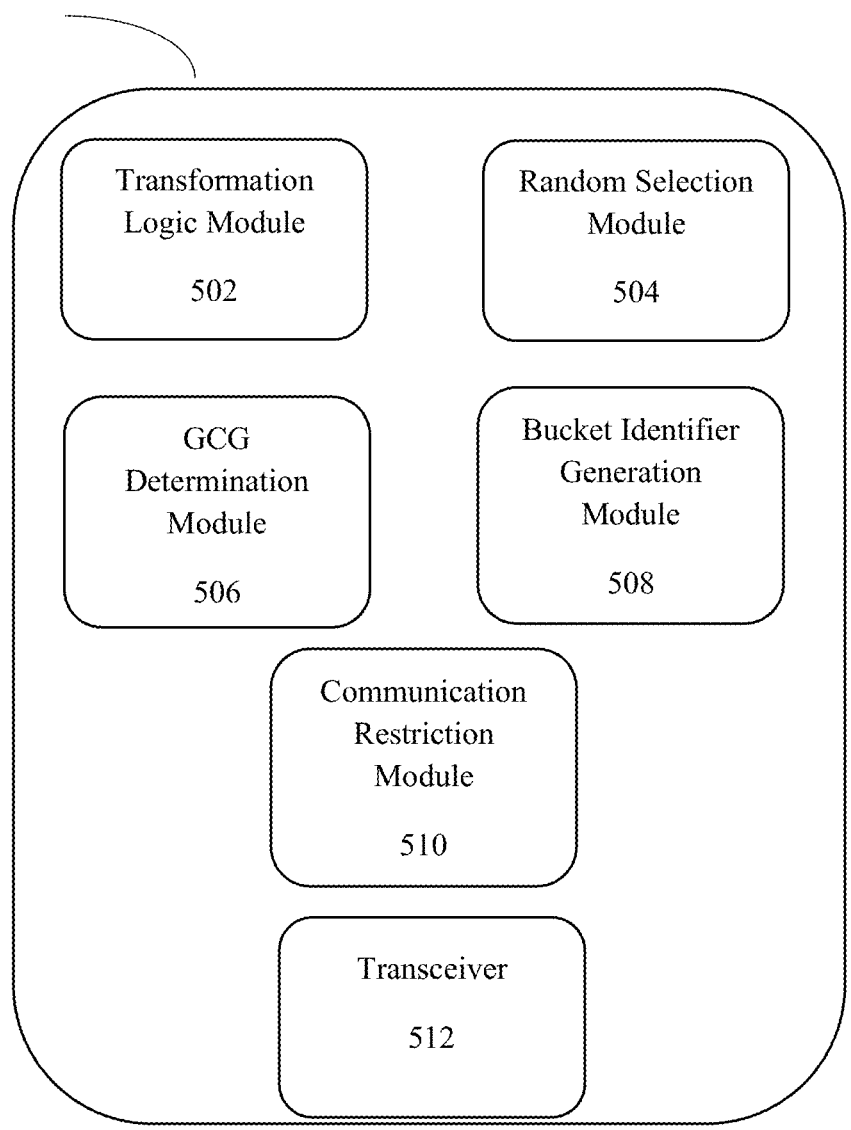
FIG. 5 illustrates structural components of the system for performing the method of managing the GCG, in accordance with an example embodiment.

Referring to FIG. 5 now, the processor 108 of the system 102 comprises one or more module or structural components to perform the one or more steps defined in FIG. 2. In an embodiment, one or more user identifiers stored in a database are transformed via Transformation Logic Module 502, to generate respective one or more bucket identifiers. The system selects randomly a predetermined number of the one or more bucket identifiers as members of GCG via a random selection module 504. The system may receive one or more user identifiers via Transceiver 512. The system may generate via Bucket Identifier Generation Module 508 the respective one or more bucket identifiers corresponding to the received one or more user identifiers. The GCG Determination Module 506 may be utilized to determine presence of the one or more generated bucket identifiers within the selected bucket identifiers of the GCG and the system restrict the communication event based on the determination via the Communication Restriction Module 510.

Exemplary embodiments discussed above may provide certain advantages. Though not required to practice aspects of the disclosure, these advantages may include those provided by the following features:

1. As discussed above, the system computes the GCG in the run time environment when a communication event is to be executed. Thus, by doing so the need of storing the GCG groups prior to the communication event is excluded, hence making the system more space efficient and inexpensive 2. Further, the system ensures storing only the meta data and hence editing the meta data becomes easy and the system's efficiency is improved. 3. Allocating the bucket identifiers to the GCG rather than assigning users helps accommodating change in the size of the GCG 4. Causal Inference: The system enables organisations to draw conclusions about the causes of their activities by comparing the behaviour of users who receive an intervention to users in the control group. 5. Effective Marketing: By optimising their tactics based on data rather than conjecture, marketers may utilise this technique to gauge the true impact of engagement activities. 6. Ethical Considerations: The method enables organisations to evaluate potentially harmful interventions by exposing a smaller selection of users to those risks while shielding the majority. 7. Statistical Validity: The approach makes it easier to use statistical tests to assess the importance of results, hence ensuring the accuracy of conclusions. 8. Regulatory Compliance: In sectors where there are laws, the system aids organisations in adhering to rules by offering proof of thorough testing and validation. 9. Enhanced Learning: Even experiments that don't provide the anticipated outcomes still offer insightful information that aids in organisational learning and development. 10. Enhanced User Experience: The system makes sure that modifications have a good effect on the user experience by testing user interface changes, content variations, or feature additions.

The system and method disclosed in the present application, for securely transmission of data has a wide variety of application, for example but not limited to: 1. Marketing: measuring the success of marketing initiatives through the use of controlled tests. Marketers can assess the genuine effectiveness of their ads by picking users at random for engagement and comparing them to the GCG. 2. Research on user experience: assessing adjustments or enhancements to the user experience on websites or apps. Researchers can look at how users' behaviour varies depending on whether they use the control group or a new user interface. 3. Content Promotion: experimenting with various content tactics to see which one engages users or converts them to customers the best. 4. Training and Education GCGs can be used in educational technology to assess the efficacy of various instructional strategies or content delivery philosophies. 5. Healthcare and clinical trials: GCGs can be used in medical studies to maintain a control group that does not get the treatment while assessing the effectiveness of novel interventions or therapies. 6. Risk Administration: Prior to implementing significant changes or tactics, risks should be evaluated and potential negative effects should be mitigated, and the like.

The invention claimed is:

1. A method of managing a Global Control Group (GCG) for a communication event, comprising:
   transforming one or more user identifiers stored in a database to generate respective one or more bucket identifiers, wherein the one or more user identifiers correspond to one or more users;
   selecting randomly a predetermined number of bucket identifiers from the one or more bucket identifiers, wherein the selected bucket identifier corresponds to a member of the GCG;
   dynamically adjusting a size of the GCG when the one or more user identifiers in the database reaches or exceeds a predetermined threshold triggered by the additional or removal of one or more user identifiers in the database;
   receiving a user identifier from the one or more user identifiers in a run time environment for executing the communication event;
   generating a respective bucket identifier corresponding to the received user identifier in the run time environment;
   determining presence of the generated bucket identifier with the selected bucket identifiers of the GCG, wherein the determining comprises:

matching the generated bucket identifier with the selected bucket identifiers of the GCG; and identifying the matched bucket identifier as a part of the GCG; and when the matched bucket identifier is identified as part of the GCG, excluding the one or more users corresponding to the matched bucket identifier from receiving information associated with the communication event.

2. The method as claimed in claim 1, further comprising: transmitting one or more messages to a user corresponding to a user identifier when the generated bucket identifier does not match with the selected bucket identifiers of the GCG.

3. The method as claimed in claim 1 further comprising: allowing dynamic adjustment of a size of the GCG when one or more user identifiers are added or removed from the database.

4. The method as claimed in claim 3, wherein the dynamic adjustment is performed by modifying the predetermined number for the selected bucket identifiers.

5. The method as claimed in claim 1, wherein the respective bucket identifier is generated from the received user identifier by executing a hashing algorithm on the user identifier.

6. The method as claimed in claim 1 further comprising: storing information related to the one or more transformed bucket identifiers in a memory; and editing the stored information in the run time environment.

7. The method as claimed in claim 6, wherein the stored information corresponds to metadata associated with the one or more bucket identifiers, and wherein the metadata includes at least one of: user identifier, name, and email address of a corresponding user.

8. The method as claimed in claim 1 further comprising: generating a notification notifying the received user identifier is determined as the part of the GCG.

9. The method as claimed in claim 1, wherein a bucket identifier of the transformed bucket identifiers corresponds to one or more user identifiers.

10. The method as claimed in claim 1, wherein the one or more user identifiers are transformed to generate respective bucket identifiers by executing a hashing algorithm.

11. The method as claimed in claim 10, wherein the hashing algorithm employs a discrete uniform distribution of the one or more user identifiers among the one or more bucket identifiers.

12. The method as claimed in claim 1 further comprising: storing the predetermined number of the bucket identifiers as a part of the GCG.

13. A system for managing a Global Control Group (GCG), comprising:

a memory; and a processor communicatively coupled to the memory, and wherein the processor is configured to execute one or more instructions stored in the memory to:

transform one or more user identifiers stored in a database to generate respective one or more bucket identifiers, wherein the one or more user identifiers correspond to one or more users;

select randomly a predetermined number of bucket identifiers from the one or more bucket identifiers, wherein the selected bucket identifiers are part of the GCG;

dynamically adjusting a size of the GCG when the one or more user identifiers in the database reaches or exceeds a predetermined threshold triggered by the additional or removal of one or more user identifiers in the database;

receive a user identifier from the one or more user identifiers in a run time environment for executing the communication event;

generate a respective bucket identifier corresponding to the received user identifier in the run time environment;

determine presence of the generated bucket identifier within the selected bucket identifiers of the GCG, wherein the determining comprises:

match the generated bucket identifier with the selected bucket identifiers of the GCG; and identify the matched bucket identifier as a part of the GCG; and when the matched bucket identifier is identified as part of the GCG, excluding the one or more users corresponding to the matched bucket identifier from receiving information associated with the communication event.

14. The system as claimed in claim 13, further comprising:

transmitting one or more messages to a user corresponding to a user identifier when the generated bucket identifier does not match with the selected bucket identifiers of the GCG.

15. The system as claimed in claim 13 further comprising: allowing dynamic adjustment of a size of the GCG when one or more user identifiers are added or removed from the database.

16. The system as claimed in claim 13, wherein the respective bucket identifier is generated from the received user identifier by executing a hashing algorithm on the user identifier.

17. The system as claimed in claim 13 further comprising: storing information related to the one or more transformed bucket identifiers in a memory; and editing the stored information in the run time environment.

18. The system as claimed in claim 17, wherein the stored information corresponds to metadata associated with the one or more bucket identifiers, and wherein the metadata includes at least one of: user identifier, name, and email address of a corresponding user.

19. The system as claimed in claim 13 further comprising: generating a notification notifying the received user identifier is determined as the part of the GCG.

\* \* \* \* \*